United States Patent [19]
Tobey et al.

[11] 3,921,485
[45] Nov. 25, 1975

[54] ROTARY BLADE ASSEMBLY

[75] Inventors: Hubert E. Tobey, Milltown; John W. Hood, East Brunswick; Dee L. Irvin, Moonachie, all of N.J.

[73] Assignee: International Telephone and Telegraph Corporation, Nutley, N.J.

[22] Filed: June 25, 1974

[21] Appl. No.: 482,924

[52] U.S. Cl. .................................... 83/342; 83/672
[51] Int. Cl.² ...................... B23D 25/04; B26D 1/56
[58] Field of Search ...................... 83/672, 340, 342

[56] References Cited
UNITED STATES PATENTS

| | | | |
|---|---|---|---|
| 149,640 | 4/1874 | Cluney et al. | 83/340 X |
| 1,909,029 | 5/1933 | Walter | 83/672 X |
| 3,820,580 | 6/1974 | Meserue et al. | 83/672 X |

Primary Examiner—Willie G. Abercrombie
Attorney, Agent, or Firm—John T. O'Halloran; Menotti J. Lombardi, Jr.

[57] ABSTRACT

A rotary blade assembly is provided having two slicing blades, each blade edge traverses a helical path during rotation of the assembly. In a complete rotation of the blade assembly, each of the helical cutting edges produces a slice of a product. The assembly permits changing the helical slicing position of the blades to a grinding position, so that the cutting edge of the blades moves on the perimeter of a circle to facilitate grinding. The assembly also permits compensation for the grinding of the cutting edge by adjustably positioning the two slicing blades relative to the item being conveyed through the blade slicing position.

18 Claims, 14 Drawing Figures

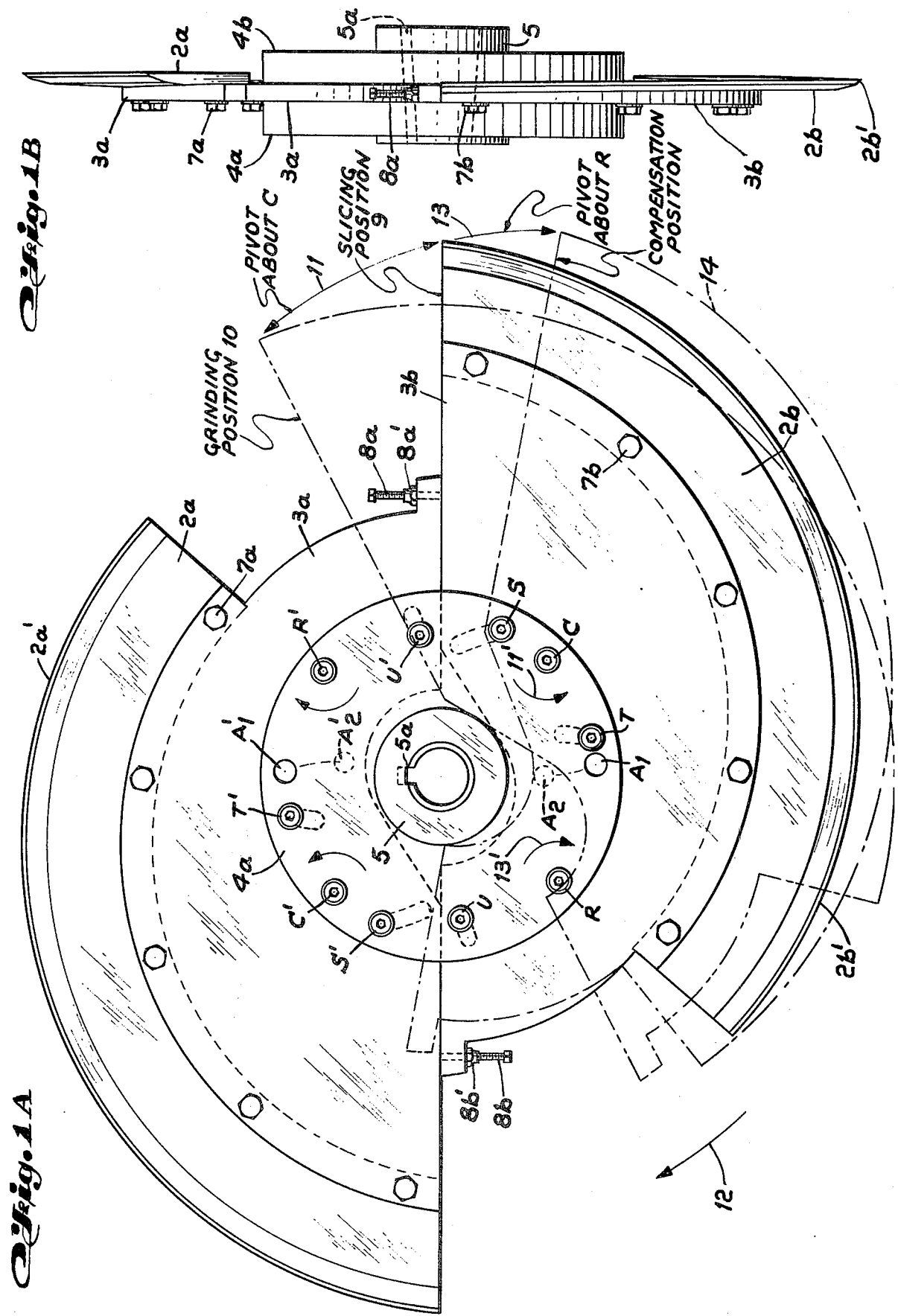

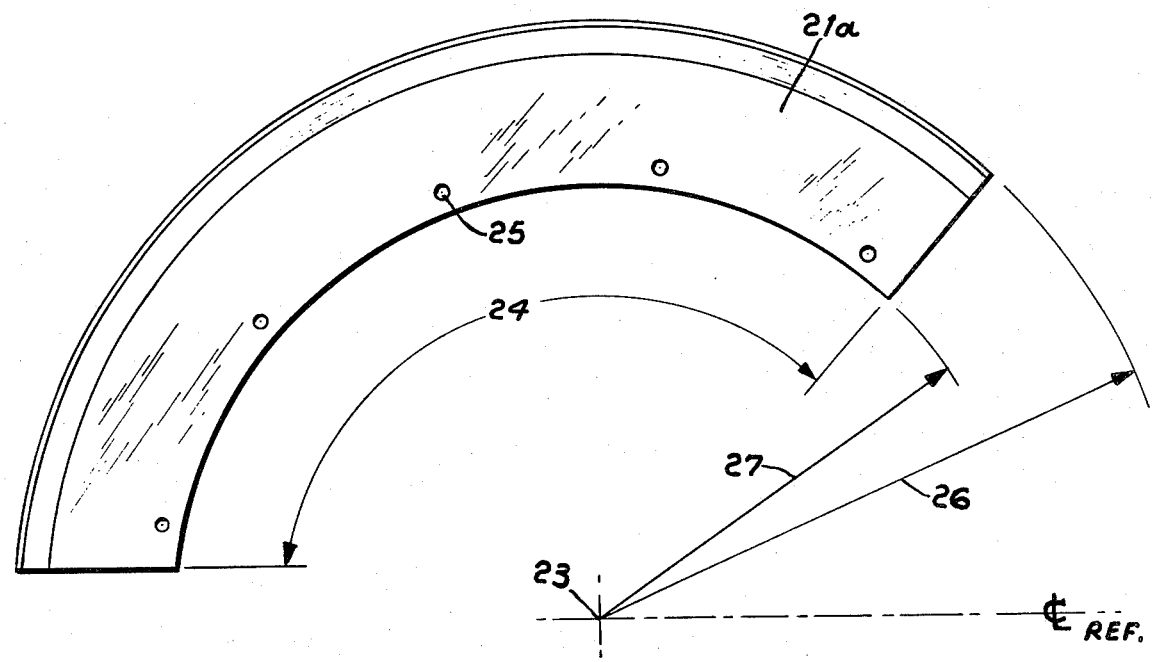
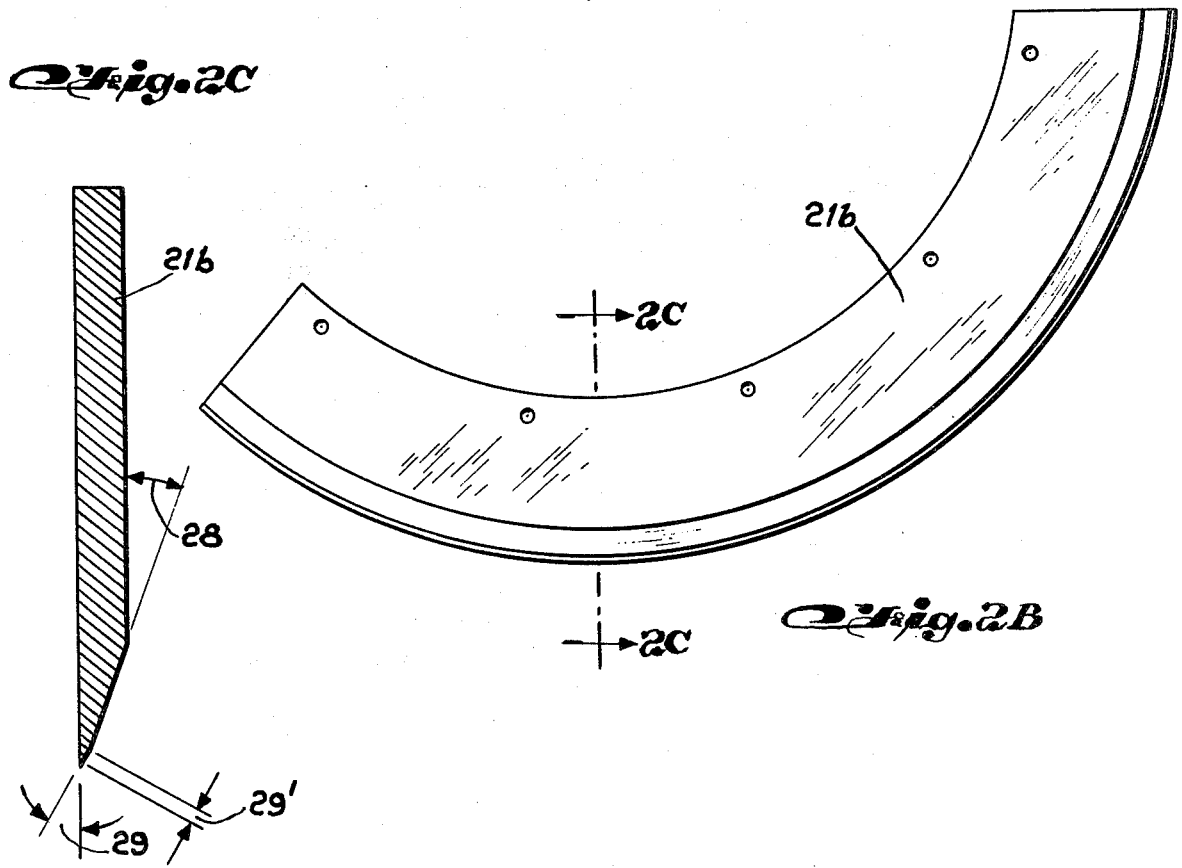

ROTARY BLADE ASSEMBLY

CROSS-REFERENCE TO RELATED APPLICATIONS

This application is related to patent application Ser. No. 393,520, filed Aug. 31, 1973 entitled "Adjustable Slicing Apparatus" and assigned to the same assignee of this application. Insofar as the cross-reference application is necessary for an understanding of the instant application, it is incorporated herein by reference.

BACKGROUND OF THE INVENTION

This invention relates generally to article slicing machines and specifically to the slicing blade or rotray slicer blade of the type for slicing bacon and the like.

The rotary slicer or knife blade of the cross-reference application is of the type incorporating a knife edge with a helical cutting edge. In operation, the rotary cutter or knife edge is mounted about the shaft and secured thereto in a predetermined relation to rotate therewith. The helix formation knife edge corresponds to the thickness of the slice into which the bacon or other article is to be cut and permits a feed of the material equal to the thickness of a slice cut by the knife. This helical cutting knife is an industry standard and is shown in numerous prior art patents in addition to the cross-reference application. See for example U.S. Pat. No. 3,642,046 which illustrates in FIG. 2 this typical disk slicing blade having a helix form cutting edge to enable slicing a complete slice of bacon or other article in one revolution.

The slicing blades normally rotate at approximately 1,200 to 1,400 rpm producing 1,200 to 1,400 slices of bacon or other product. Since slabs of unsliced bacon or other products are usually cut in a semi-frozen condition, i.e., generally within the range of 25° to 35°, it is important that the sliced bacon surfaces be clean, smooth and free of ragged edges. To maintain the quality and speed of production, it is necessary that the blade be run at the 1,200 to 1,400 rpm speed to produce the output necessary, but it also necessitates that the blade be removed periodically to sharpen the helical cutting edge.

The blade must be removed from the equipment since the helical cutting edge is not a uniform edge and requires special handling for grinding the helical surface, i.e. it is an irregular spiralling surface and not a constant diameter surface. The life of the cutting edge could also be increased by reducing the speed of the rotation of the blade, but this would result in reduced output per unit time of machine operation. Therefore, problems presently exist in using a helical shaped cutting edge of the prior art. The life of the helical cutting edge is not as long as it should be requiring periodic shutdown for sharpening, and the knife must be removed so that the knife edge can be sharpened in a machine shop facility.

Accordingly, it would be very advantageous to have a knife cutting edge having a helical curvature, low rotating speed, and reduced downtime for sharpening and maintenance of the blade. This desirous end result was achieved according to the invention by a novel type rotary blade cutting arrangement which permits a longer life of the cutting edge between sharpening cycles while producing the same output per unit time of operating machine and further, enables sharpening of the knife edge surface without removal of the rotary blade arrangement from the slicing machine or apparatus.

SUMMARY OF THE INVENTION

It is therefore an object of the invention to provide an improved rotating blade arrangement.

It is also an object of the invention to provide a novel rotating slicer assembly which overcomes the problems of the prior art.

According to the broader aspects of the invention, there is provided a blade assembly which includes two slicing blades capable of traversing a helical path to accomplish slicing of slabs of bacon and the like. The assembly of the invention allows two slices to be produced in one complete rotation of the blade assembly. The assembly enables grinding of the peripheral edge of the cutting blades on a perimeter of a circle rather than the helical or spiral configuration traversed during slicing.

A feature of the invention is that the grinding of the cutting edge may be accomplished on the slicing machine, without removal of the blade assembly by adjustment of a number of cap screws which retain the blade in position during slicing and grinding.

Another feature of the invention is that the mounting of the blades to the apparatus is configured so that the cap screws may be adjusted to compensate for grinding so that maximum blade life is possible due to adjustment of the blades.

A still further feature of the invention is that this cutting knife is suitable for cutting single or stacked food products on an indexing conveying arrangement as well as a continuous conveying arrangement.

The foregoing objects and features of the invention will best be understood if reference is made to the following description in connection with the drawings, in which:

FIGS. 1A and 1B are front and side view assembly drawings of the rotary blade assembly according to the invention;

FIGS. 2A, 2B, and 2C show details of the slicing blades;

DESCRIPTION OF THE PREFERRED EMBODIMENT

Figure 3A:
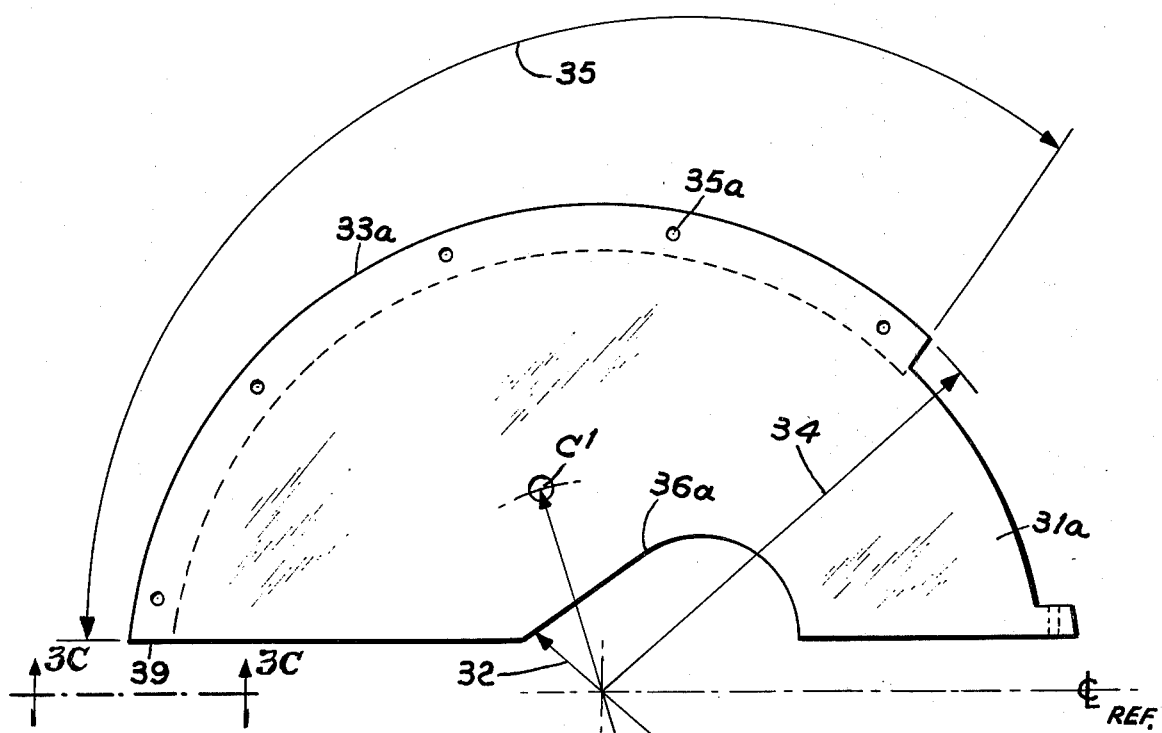
FIGS. 3A, 3B, 3C and 3D show details of the blade mounting plates.

Referring now to FIGS. 1A and 1B, FIG. 1A shows a frontal view of the slicing blade assembly and FIG. 1B is an end view of the blade assembly of FIG. 1A. The assembly comprises two slicing blades 2a and 2b fixedly attached to mounting plates 3a and 3b, respectively. The mounting plates are mounted between a front hub plate 4a and a rear hub plate 4b. The front and rear hub plates 4a and b are fixedly mounted to a hub 5 having a keyway slot 5a for fixing the blade assembly to the drive shaft of the slicing machine apparatus.

The solid lines in FIG. 1A show the blade slicing position 9 without adjustment. Mounted to each blade mounting plate 3a and 3b are set screws 8a, 8b which are lockable in a set position by the hex-flex locks 8a', 8b'. The upper slicing blade 2a is mounted to the upper blade mounting plate 3a by five cap screws 7a equally spaced as indicated. The lower slicing blade 2b is also mounted to the lower blade mounting plate 3b by five hexagonal cap screws 7b. The upper and lower blade mounting plates 3a and 3b are each mounted between the front and rear hub plates 4a and 4b by means of five cap screws, U, R, T, C, S and U', R', T', C', S' as indicated. The screws are inserted as shown in solid lines in the drawing for the blade assuming the normal slicing position 9. Screws U, R, T, S may be removed and the blade mounting plate 3b with slicing blade 2b rotated about C in the direction of arrow 11' in a manner shown in dashed lines to the grinding position 10. The blade is moved through the angle indicated by arrow 11 by pivoting the mounting plate and slicing blade assembly about screw pivot points C. It will be noted that only the lower blade mounting plate 3b and slicing blade 2b have been shown in the grinding position for simplicity, whereas both the top portion and the bottom portion are pivoted about C, C' to assume the grinding position. You will note in FIG. 1 that the blade edges 2a', 2b' follow the helix shape of the slicing apparatus of the prior art. The blades are also capable of assuming a grinding position 10 by loosening and removing screws and then inserting screws in aligned holes $A_1$, $A_2$, $A_1'$, $A_2'$. The blade edges 2a', 2b' are then on the perimeter of a circle to enable grinding of the cutting edge on a true circle rather than on a helical curve. Therefore, the sharpening does not require the elaborate equipment necessary to sharpen the helix edge of the slicing position.

The direction of rotation of the cutting blade assembly is in the direction of arrow 12, and due to repeated grinding of the edges 2a', 2b', compensation is provided to enable each upper mounting plate and lower mounting plate assembly to be adjusted to the angle indicated by arrow 13 to the maximum compensation position indicated by dash lines 14. Again, only one mounting plate and slicing blade assembly has been indicated as being in dash lines whereas according to the arrangement both the lower and upper plates are shifted in a complementary fashion and the set screws 8a, 8b adjusted to compensate for the space between upper and lower mounting plates. The pivoting is accomplished by removing screw C, and loosening S, T and U and pivoting about R in the direction of the arrow 13' to the desired compensated position. The screws are then tightened and slicing resumed. The three positions are more clearly shown in a mounted configuration in FIGS. 5, 6 and 7 to enable comparison. Also, the details of the slicing blade mounting plates and hub plates will be further described in connection with the FIGS. 2 through 4 to enable a better understanding and appreciation of the invention.

Referring now to FIGS. 2A through 2C, FIG. 2A illustrates the top slicing blade 21a and FIG. 2B the bottom slicing blade 21b. Each blade is machined from an approximate ¼ inch hardened steel from a common center point 23 with an arc dimension 24 of approximately 130°. Five holes 25 are equally spaced about each arc segment forming the blade. Typically, the outer radius 26 is on the order of 14 inch and the inner radius 27 is on the order of 10 inch. The five holes are equally spaced and tapped. The cutting edge is shown in detail in FIG. 2C. The edge is formed by a 20° typical angle 28 and a 30° typical angle 29 for the 1/16th inch wide land 29'. As indicated in FIGS. 2, the blades themselves are easily machined since they are segments of a circle, and the grinding and cutting is not of the nature and complexity required to cut a helix or spiral on the slicing blades of the prior art. Also, the material necessary to form the cutting edge is much less than that which would be required to form a complete single-edge blade with a helical configuration.

Figure 3B:
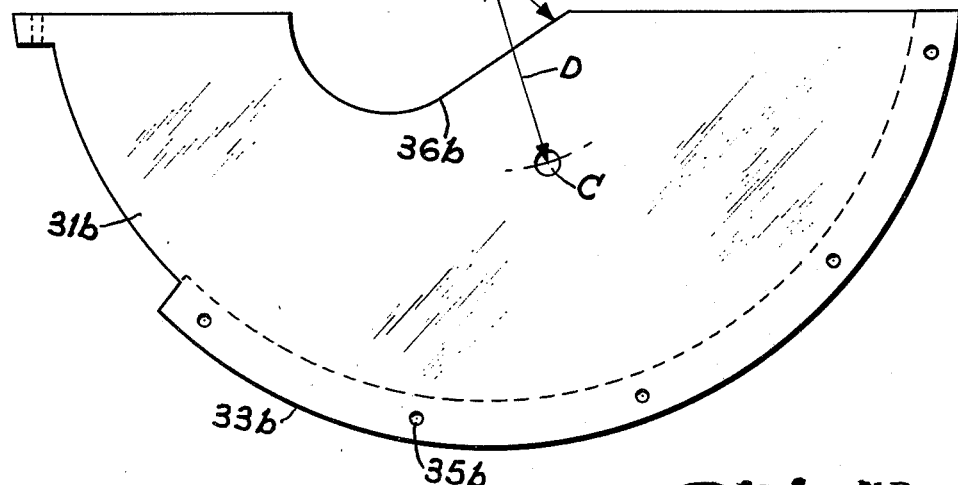

Referring now to FIGS. 3A and 3B, the top blade mounting plate 31a and the lower mounting plate 31b are illustrated. The top and bottom mounting plates are shown separated by a diameter 32 which is equivalent to the hub diameter about the referenced center line. Each plate 31a, 31b has an outer periphery 33a, 33b for mounting of the blades at a radius 34 over an arc 35 of approximately 130° which is similar to that of the slicing blade itself. Five equally spaced holes 35a, 35b similar to the holes on the slicing blade are also positioned in the mounting plates. Similar hub camming surfaces 36a, 36b are also provided in the plates in a complementary manner with reference to the center line and centered to enable sliding and movement of the top mounting plate and bottom mounting plate about the hub, so that the plates may assume the various positions. Reference holes C, C' are provided and are equidistant from the referenced center line at a diameter D to enable pivoting of the top and bottom plates about the hub as illustrated in FIG. 1A.

Figure 3C:
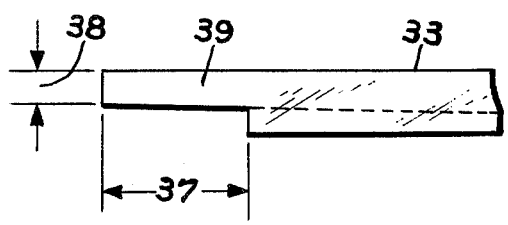

Referring now to FIG. 3C which is a partial cross-section and end view of FIG. 3A, a slot 37 is cut to a varying depth 38 around the 130° of the perimeter 33a, 33b of the blade mounting plates. If, for example, the blade cutting plate has a thickness of ½ inch, then the machine slot would have a width 37 of approximately 1 inch and the depth of the slot would start at the surface 39 at a depth of approximately ⅛ inch and gradually decrease to zero inches around the 130° reference periphery. This provides the necessary cant of the knife to compensate for the forward movement of the slab of bacon during the cutting procedure and should be readily understood with the knife rotating in the direction indicated in FIG. 1.

Figure 3D:
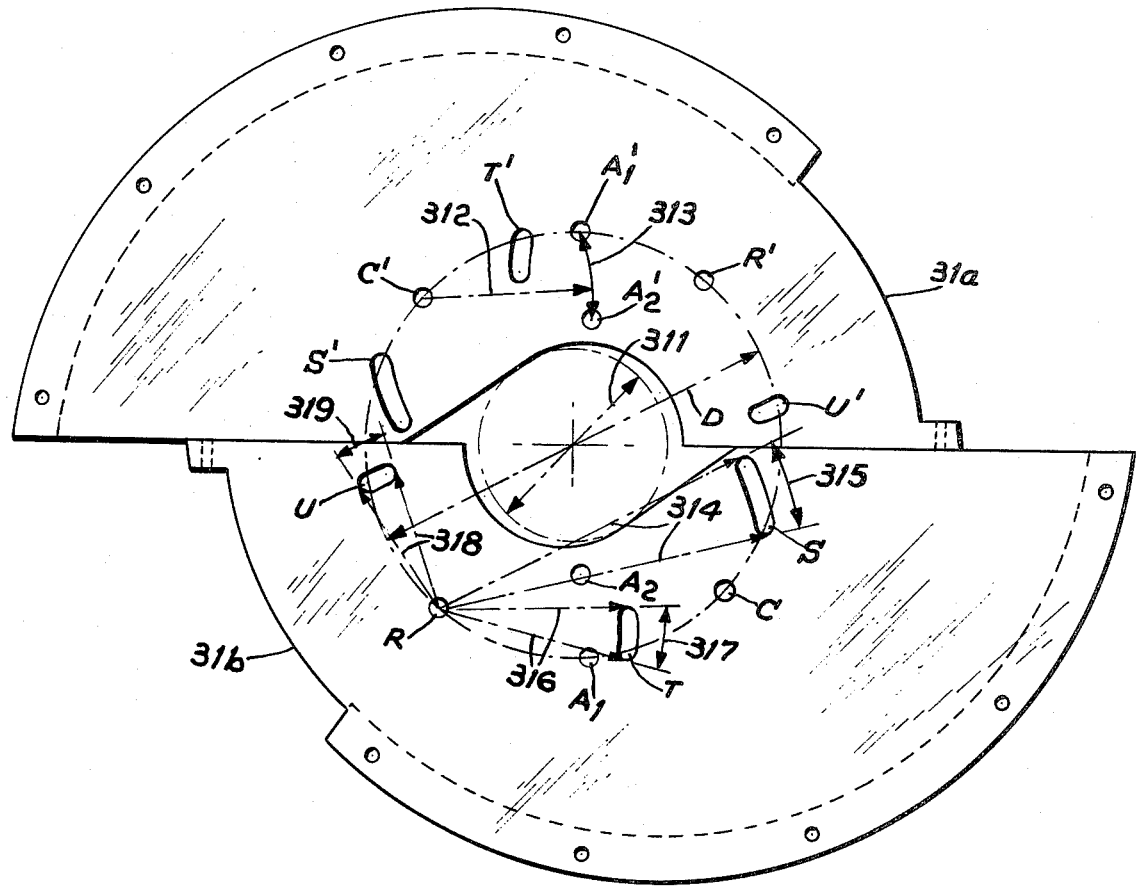

Referring now to FIG. 3d, the upper and lower mounting plates 31a, 31b are shown in the position about diameter 311 for providing the necessary mounting holes to enable adjustment of the cutting blades from the slicing position to the grinding position, or to an adjustable compensation position. The referenced C and R holes are spaced at a diameter D established in FIG. 3B and the remaining holes are spaced therefrom as indicated. From the reference pivot holes C, C', the holes $A_1'$, $A_2'$ and $A_1$, $A_2$ are drilled and tapped at a predetermined distance radius 312 and spaced at an arc distance 313. The referenced holes R, R' for pivoting of the blade for compensation for the grinding are provided. The slots S and S' are provided at a distance 314 and over the arc distance 315. The drawing only indicates the reference numerals on 31b or 31a but both are similarly constituted. Also with reference to the drilled and tapped holes R, R', the slots T, T' are provided at a distance 316 over an arc distance 317. The slots U, U' are provided at a distance 318 over an arc distance 319. With this hole and slot configuration consistently drilled with reference to each other and to the hub diameter 311, the adjustments are readily made. The cutting blades are able to assume the slicing position as more clearly shown in FIG. 5. The blade may then pivot about C, C' with the proper screws removed to assume the constant diameter grinding position shown in FIG. 6, and after grinding is completed, adjustments may be made, as necessary, by pivoting about R, R' and tightening the set screws in slots S, T, U and S', T' and U' to a compensated slicing position as shown in FIG. 7.

Figure 4A:
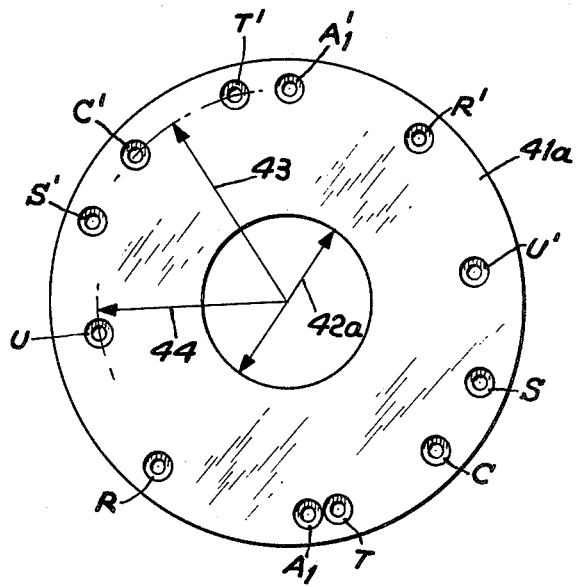
FIGS. 4A and 4B show details of the front and rear hub plates.
Figure 4B:
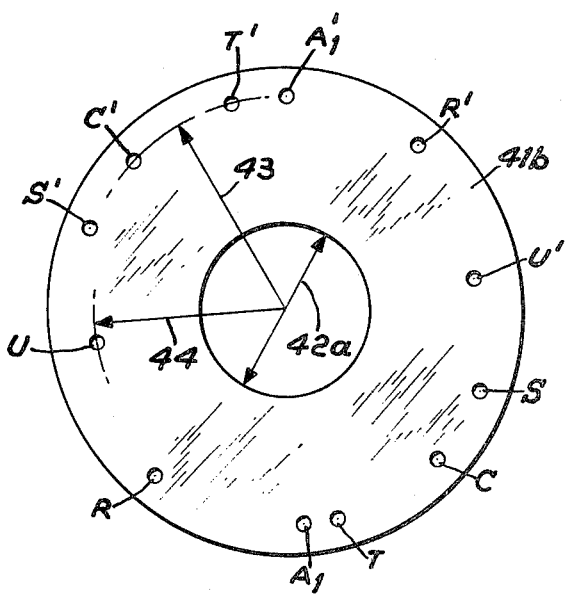

Referring now to FIGS. 4A and 4B, there is illustrated the front hub plate 41a and the rear hub plate 41b. The inner diameter 42a of hub plate 41a and the inner diameter 42b of hub plate 41b is adapted to press fit on the outer diameter of hub 5 in FIG. 1. At radius 43 are positioned drilled and counterbored holes C, C', S, S', T, T', $A_1$, $A_1$' R, R' and at slightly smaller radius 44 is positioned drilled and counterbored holes U and U'. These are drilled on the same radius as the corresponding identified holes of FIG. 3D. The rear hub plate 4b is similarly configured.

Figure 5:
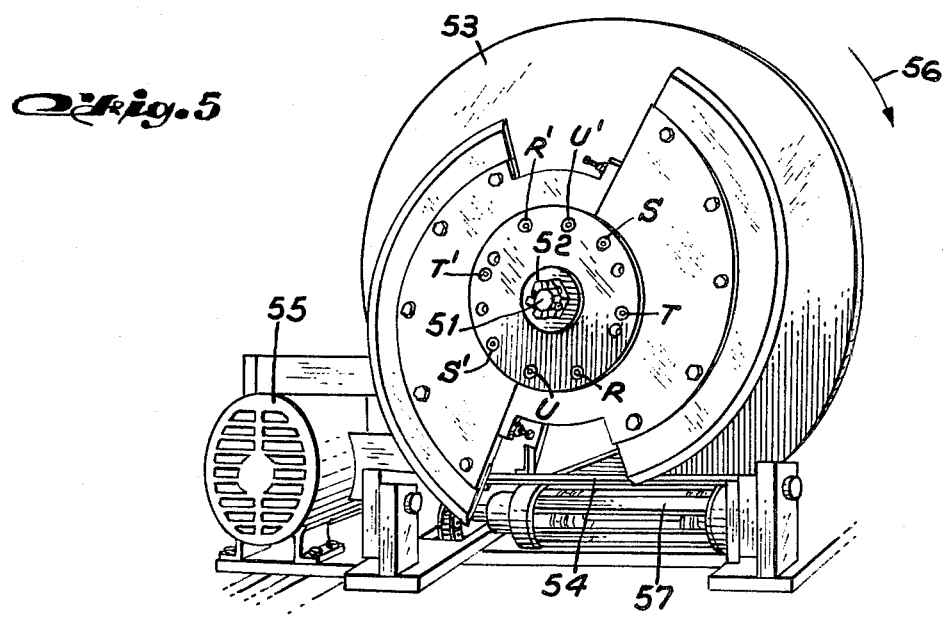
FIG. 5 shows the blade assembly mounted on a slicing machine in the slicing position.

Referring now to FIG. 5, the double helical configuration slicing edge is illustrated. The blade assembly is shown mounted to the blade slicing shaft 51 which is fixedly held to the shaft by nut 52 and a standard cotter pin. The rear housing of the slicing machine 53 and the machine cutting edge 54 are illustrated with the blades rotating and driven by means 55 in the direction of the arrow 56. Each pass of the blade cutting edge by the machine cutting edge will produce one slice, so that in one complete rotation of the blade two slices are produced. The shaft may be driven as indicated in the cross-reference application, at a speed of 600 to 700 rpm and produce the 1,200 to 1,400 slices per minute. This reduced speed will increase the life of the cutting edge and produce more uniform and sharply defined slices. It should be noted as indicated before that standard conveyor arrangement 57 may be of the continuous or indexing type conveying arrangement.

Figure 6:
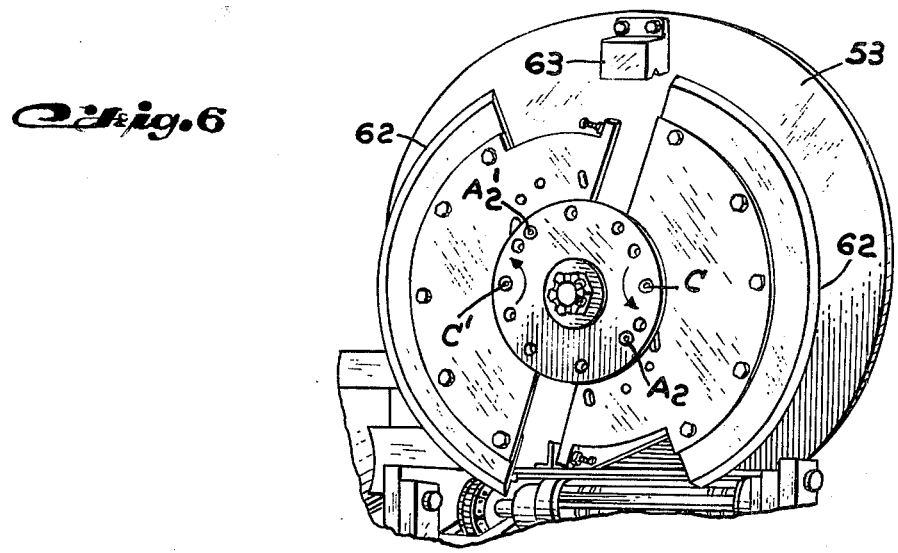
FIG. 6 shows the blade assembly mounted in the grinding position.
Figure 7:
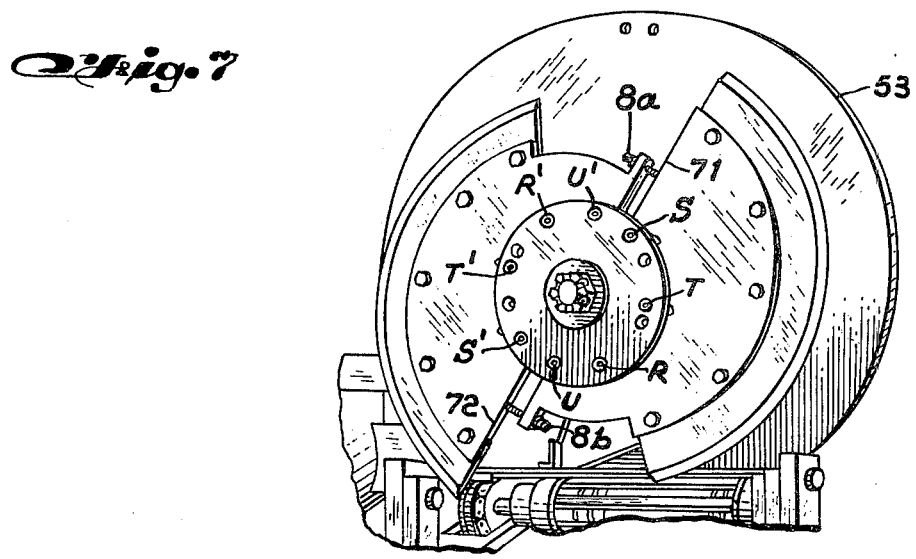
FIG. 7 shows the blade assembly in the slicing position and extended to compensate for grinding.

You will note in FIG. 6 that the cap screws are positioned in holes S, T, R, U and S', T', R', U', which is the place for the slicing position. Holes C, C', $A_1$, $A_1$' are optional in a new blade.

Referring now to FIG. 6, the same blade is shown with the foregoing screws removed and placed in holes C, C' and the pivot made as illustrated in FIG. 1, and another screw placed in $A_2$, $A_2$' to enable the grinding of the knife edge 62 by a grinding means 63 detachably mounted to the housing 53. After the sharpening has been completed, the cap screws from $A_2$, $A_2$' are removed and the blade returned to the position illustrated in FIG. 5. After the cap screws R through U, and R' through U' have been replaced, it can then be determined whether or not, due to the sharpening requirements, an adjustment must be made to the cutting edge in relation to the cutting edge. If an increase is required the S, T, U and S', T', and U' cap screws are loosened and C, C' removed, if necessary, and the blade assemblies are pivoted about R, R' to provide the necessary adjustments. After the compensation adjustment is made, the lock screws 8a, 8b are adjusted till lock screw 8a meets surface 71 and lock screw 8b meets surface 72 of the blade assembly. The blade is now ready for production operation having been sharpened on the machine and adjusted with a minimum of interruption of operation. Additionally, the down-time of the production machine has been further reduced because due to the double slicing surfaces, the machine is now able to run at half the speed of the prior art machines without a loss of the helical cutting edge and still produce the same product volume.

While we have described above the principles of our invention in connection with specific apparatus, it is to be clearly understood that this description is made only by way of example and not as a limitation to the scope of our invention as set forth in the objects thereof and in the accompanying claims.

We claim:

1. Apparatus for slicing, comprising:
   a slicing blade rotatably mounted in a cutting plane;
   a mounting plate for adjustably mounting said blade to enable the blade cutting edge in one position to move in a helical path;
   means for mounting and retaining said plates in said one position; and
   means for adjusting and retaining said blade in a second position in which the blade edge traverses a circular path.

2. Apparatus according to claim 1, including means to enable fixing said blade in a third position which compensates for wear of the cutting edge, said third position also traverses a helical path.

3. The apparatus of claim 2, including hub means for rotatably mounting said mounting plate to a shaft of said slicing apparatus.

4. Apparatus for slicing, comprising:
   first and second slicing blades;
   first and second mounting plates for adjustably mounting said blades in a cutting plane so that each blade cutting edge moves in a helical path to produce a slice in each complete rotation of the blades; and
   means for adjustably retaining said mounting plates in a plurality of positions.

5. Apparatus for slicing according to claim 4, wherein said blades in one of said plurality of positions move in a circular path.

6. Apparatus according to claim 5, wherein said blades in another of said plurality of positions compensate for wear of the cutting edge, said other position also traverses a helical path.

7. The apparatus of claim 4 wherein said first and second slicing blades are segments of a circle; and
   said first and second mounting plates are complementary configured.

8. A rotary blade arrangement comprising:
   a first slicing blade and mounting plate assembly;
   a second slicing blade and mounting plate assembly;
   hub plate means for retaining said first and second assemblies in a plurality of positions;
   means for mounting said hub plate means to a driven shaft, whereby in a first position the cutting edges of said assemblies traverse a helical path in a cutting plane; and
   said first and second assemblies each include a mounting plate having a plurality of predeterminately located slots and holes.

9. The arrangement of claim 8, wherein said assemblies are adjustable to a second position in which the cutting edges traverse a circular path.

10. The arrangement of claim 9, wherein the second position is a grinding position for said assemblies.

11. The arrangement of claim 8, including means to enable adjustment of said assemblies to a third position in which said assemblies are laterally displaced from one another a predetermined amount, and the cutting edges of said assemblies traverse a helical path in said third position.

12. The arrangement of claim 8, wherein said first and second assemblies each include a slicing blade comprising a segment of a circle.

13. The arrangement of claim 8, wherein one mounting plate includes a hub camming surface which is complementary to the camming surface on the other mounting plate.

14. The arrangement of claim 13, wherein said hub plate means includes a front hub plate and a rear hub plate; and
  said front plate contains holes and said rear hub plate contains tapped holes, said holes and tapped holes being identically positioned relative to each other and in a predetermined location relative to said mounting plates.

15. The assembly of claim 14, wherein said mounting means includes a hub with means for engaging said shaft.

16. The assembly of claim 15, wherein said mounting plate camming surface makes contact with said hub.

17. The assembly of claim 16, wherein said first and second assemblies include one pivot adjustment hole for said helical path, and another pivot adjustment hole for said circular path.

18. A rotary blade assembly for slicing bacon and the like comprising:
  means for conveying said bacon through a slicing plane;
  a pair of blade mounting plates;
  a pair of slicing blades, one of said pair mounted to each of said plates;
  hub plate means for adjustably mounting said plates and blades in a plurality of positions; and
  means for mounting said hub plate means to a rotatable shaft, whereby in one position the cutting edges of said blades traverse a helical path in said cutting plane to produce two slices in each rotation of said assembly.

* * * * *